United States Patent [19]

Kyryluk

[11] 3,785,720
[45] Jan. 15, 1974

[54] FILTER FOR OBTAINING A THREE-DIMENSIONAL EFFECT

[76] Inventor: William Frederick Kyryluk, 1578 W. 71st Ave., Vancouver, British Columbia, Canada

[22] Filed: May 23, 1972

[21] Appl. No.: 256,016

[52] U.S. Cl.................. 350/144, 178/6.5, 350/314
[51] Int. Cl.......................... G02b 27/22, G02b 5/22
[58] Field of Search............................ 350/144, 314; 178/6.5

[56] References Cited
UNITED STATES PATENTS

| | | | |
|---|---|---|---|
| 3,445,153 | 5/1969 | Marks et al.......................... | 350/144 |
| 2,590,080 | 3/1952 | Adams............................. | 350/314 X |
| 3,592,112 | 7/1971 | Frey................................ | 350/314 X |
| 3,244,547 | 4/1966 | Orr et al. ......................... | 350/314 X |
| 3,603,672 | 9/1971 | Bastide .............................. | 350/314 |

OTHER PUBLICATIONS

The Optician Vol. CXXI, Issue No. 3121, p. 7 Jan. 26, 1951 "Neutral Filters For Television"

Primary Examiner—Paul A. Sacher
Attorney—Brian J. Wood

[57] ABSTRACT

Light transmitting filter for obtaining apparent three-dimensional effect when viewing two-dimensional image on screen. Filter has tinting density so that light from image passed by filter is reduced so that two-dimensional image viewed through the filter appears as three-dimensional image. Filter has neutral grey tinting density within specified limits and is used in spectacles for viewing television or movie screens, or as separate screen in front of television screen. For separate television screen only, outer surface of screen is textured to reduce undesirable reflections, texture being such that small portion of area of filter surface is covered by discrete raised portions projecting from surface. Textured surface produced by spraying screen with clear lacquer so that droplets of spray falling on surface do not coalesce but produce discrete raised portions closely spaced so that portion of outer surface of filter remains between adjacent droplets.

10 Claims, 7 Drawing Figures

PATENTED JAN 15 1974　　　　　　　　　　　　　　　　3,785,720
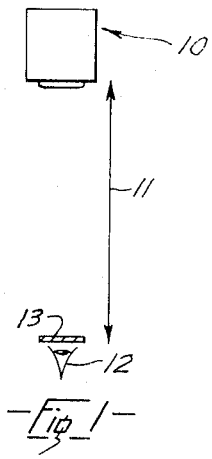
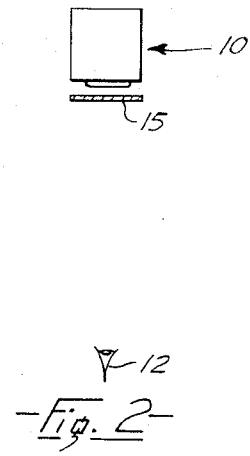
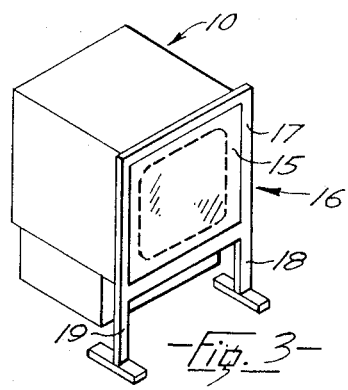
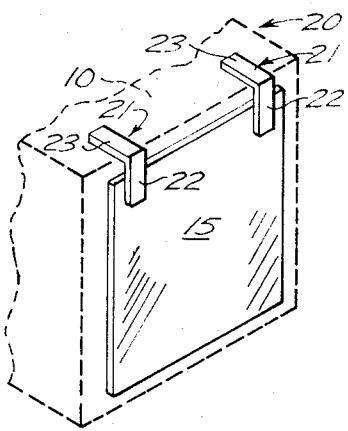
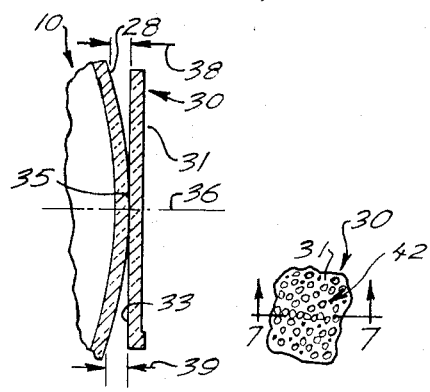
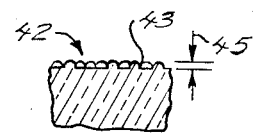

FILTER FOR OBTAINING A THREE-DIMENSIONAL EFFECT

BACKGROUND OF THE INVENTION

1. Field of the Invention

The invention relates to a light transmitting filter for obtaining an apparent three-dimensional effect when viewing television or movie screens showing monochrome or colour images, and a method of producing such a filter.

2. Prior Art

Stereoscopic image projecting systems are known and such systems produce a stereoscopic visual effect by permitting a viewer to view simultaneously a pair of two-dimensional images produced from photographs taken from separated positions. Some of these systems are expensive and require projecting two superimposed images onto a screen, the images being projected from stereoscopic projectors projecting stereoscopically produced films. Such images, which are true stereoscopic images, are viewed with special glasses and a three-dimensional effect is obtained by most viewers.

Another system for producing three-dimensional effects uses a screen having a surface formed of multiple angled facets which split the image and give a three-dimensional effect to some viewers, but this requires a special screen and is generally not so effective as the first system.

SUMMARY OF THE INVENTION

The invention provides an economical and simple to use filter for viewing television or movie screens, without modification of the image to be viewed apart from minor adjustment of brightness of the image. For most viewers a three-dimensional effect, as opposed to a true stereoscopic effect, is obtained by viewing the image through a neutral grey tinted filter. Percentage of incident light that is transmitted through the filter is dependent on grain size of the medium used to tint the filter which medium may be a pigment or dye. Number of grains per unit area, reflectively, and opacity of the grains are further factors that also affect light transmission. Hereinafter, such factors are referred to collectively as "tinting density" which is inversely proportional to light transmission.

The filter can be used in spectacles, or as clip-on filters releasably fastened to conventional spectacles having corrective lenses and used to view television or movie screens. For television screens only, a separate filter of lighter tinting density is placed in front of the television set between the viewer and the television, thus dispensing with the spectacle filters. The filter used with the television screen can be further modified by a method according to the invention, the method including spraying an outer surface of the screen facing the viewer with a clear lacquer in which droplets of lacquer dry on the outer surface and do not coalesce but form discrete raised portions. Such modification enhances the three-dimensional effect and reduces undesirable reflections from extraneous light sources.

A detailed description following related to drawings gives exemplification of structure according to the invention and a method according to the invention of producing one such structure, the invention being capable of expression in method and structure other than those particularly described and illustrated.

DESCRIPTION OF THE DRAWINGS

FIG. 1 is a diagrammatic plan view of a television set being viewed with spectacles having filters according to the invention, FIG. 2 is a diagrammatic plan view of a television set fitted with a filter according to the invention, FIG. 3 is a perspective of a floor supported frame for mounting a filter directly in front of a television screen, FIG. 4 is a perspective of a portion of a television set and filter showing brackets used to hold the filter onto a television set, FIG. 5 is a simplified section through a front portion of a television screen and an alternative filter, FIG. 6 is a detail plan view of an outer surface of the alternative filter for use with a television screen, FIG. 7 is a detail section on 7—7 of FIG. 6.

DETAILED DISCLOSURE

Tinting Density

The filters according to the invention are made from a sheet of transparent material and can be tinted by one of many conventional ways, method of tinting being immaterial to the invention. Tinting is to be uniform and neutral grey, however tinting that has a tendency towards a particular colour would not affect viewing unduly as the eye appears to compensate for a slight colour bias after a few minutes of viewing. Such colour compensation by the eye is well known, particularly in the field of colour photography.

Suitable tinting can be attained by smoking glass, using suitable controls to maintain uniformity; by glass staining techniques, and also by use of dyed plastic coating bonded to the glass. Screens made from a tinted transparent plastic can also be used, or a clear plastic sheet can be obtained which is then tinted to obtain desired tinting density. If the filter is made by cementing a thin sheet of tinted plastic to a sheet of clear plastic or glass, or by spraying a neutral grey plastic film onto clear glass or plastic, when viewing it is preferable to have the tinted portion facing the eye.

Testing specifications are available for measurement of tinting densities. A particularly convenient, economical, and simple measuring device is marketed by the Eastman Kodak Company of Rochester, N.Y., U.S.A., and is described in U.S. Pat. 2,226,167 issued 24 Dec. 1940. A device according to this patent is marketed by the above company under the name "Kodak Projection Print Scale," Kodak being a registered trade mark of the above company. The scale is used to assess exposure times when printing monochrome prints from negatives, and is obtainable through normal trade sources. The scale is a circle divided into ten sectors, each sector having a neutral tinting density differing from adjacent sectors by a controlled amount or shade so as to produce a graduation of tinting densities from a very lightly tinted sector designated 48 to a heavily tinted sector designated 2. The values of tinting density supplied in Tables I and II following relate to the designated sectors above. The tinting density of the particular filter of the invention is compared visually or with a light meter with the projection print scale so as to obtain an approximate comparison with a tinting density standard established by this particular patent. Other tinting density standards are known.

The values of tinting densities according to the Kodak print scale can be compared approximately with a grey tinted transparent plastic manufactured by Rohm GmbH of Darmstadt, Germany under the part members as below. Screens made with the Rohm produce have been used with success within the ranges stated.

| Kodak Print Scale No. | Rohm No. |
|---|---|
| 2 | 2370 |
| 8 | 2074 |
| 12 | 2064 |
| 24 | 2412 |

The Rohm 2064 transmits approximately forty-four percent of the visible light.

FIG. 1

A television set 10 is viewed at a normal viewing distance 11 in a room in which undesirable extraneous light is of low intensity compared to the television screen. One eye 12 of a viewer is shown looking through a filter 13 according to the invention. The filter can be provided in spectacles, either as non-corrective filters as used in sunglasses, or on clip-on filters adapted to fit over corrective lenses, the filters being tinted according to the invention. The filter has a tinting density selected from a range shown in Table I following, the range being dependent upon the viewing distance. Tinting density values are based on the designated sector densities as used in the Kodak (trade mark) projection print scale of U.S. Pat. 2,226,167. Outer limits of tinting densities are given as maximum and minimum values, optimum values being shown for a typical viewer.

Best effects are obtained when using opaque frames on the spectacles so as to reduce undesirable effects of extraneous light. If an undesirably dark picture is obtained, the television controls can be adjusted to increase the brightness of the image. If a movie screen (not shown) is being viewed, and the image is too dark, brightness of the projector light source can be increased to compensate. Some viewers prefer the filter for one eye to be a shade darker than the filter for the other eye, whilst still being within the ranges shown in Table 1.

TABLE I

FILTER TINTING DENSITY (Kodak Projection Print Scale) (Per U.S. Pat. No. 2,226,167)

| Viewing Distance (Feet) | Maximum | Optimum | Minimum |
|---|---|---|---|
| 5 | 2 | 16 | 24 |
| 10 | 2 | 12 | 16 |
| 15 | 2 | 8 | 12 |

FIG. 2

Filters adjacent the viewer's eyes can be eliminated when viewing a television screen by providing a filter 15 adjacent the television screen, the filter having a periphery sufficient to surround the television screen. The filter has a tinting density selected from a range of values shown in Table II, viewing distance variations within a range of common viewing distances with this type of filter being irrelevant. Best results are obtained using a non-glare filter surface facing the viewer so as to reduce effects of undesirable reflections. Two structures for supporting the filters are shown in FIGS. 3 and 4, and a method and means according to the invention for reducing undesirable reflections is described with reference to FIGS. 5 through 7.

TABLE II

FILTER TINTING DENSITY (Kodak Projection Print Scale) (Per U.S. Pat. No. 2,226,167)

| Maximum | Optimum | Minimum |
|---|---|---|
| 12 | 24 | 32 |

FIG. 3

The filter 15 is mounted in a support means 16 having a peripheral frame 17 supported on legs 18 and 19. The filter is spaced parallel to and within a few inches of the screen of the television set 10 so as to reduce chances of interference of the frame 17 with the picture, and to reduce undesirable optical effects for viewers viewing the filter at an angle other than ninety degrees to the surface of the filter.

FIG. 4

The filter 15 can be supported directly on the television set 10 (broken outline) by an alternative support means 20 having two right angle brackets 21. Vertical arms 22 of the brackets are secured to the filter, and horizontal arms 23 rest on an upper surface of the television set.

FIG. 5

The television set 10 has a screen 28 having a convex outer face onto which the image is projected. An alternative filter 30 according to the invention has an outer surface 31 facing viewers (not shown), and an inner surface 33 in contact with a central portion 35 of the television screen adjacent a central axis 36, the filter being supported by one of the support means of FIGS. 3 and 4, or an equivalent. The filter 30 is sufficiently large so as to intercept essentially all light from the television set and when the filter is disposed squarely to the axis 36, curvature of the screen 28 produces a spacing 38 between an outer edge of the screen and the filter 30. With screens of normal size and curvature, the spacing 38 rarely exceeds two inches and when the screen is disposed squarely, there will be a corresponding equal spacing 39 on an opposite side of the screen.

FIGS. 6 and 7

The outer surface 31 of the filter 30 differs from surfaces of the previously described filter by having a plurality of discrete raised portions 42, the raised portions being produced by a method according to the invention to be described. The plurality of discrete raised portions produces a surface having a particular texture, the surface hereinafter being referred to as textured surface. The raised portions are closely spaced so that a small portion of an original flat surface 43 of the filter remains between them. The textured surface difuses undesirable reflections from extraneous light sources and produces a "non-glare surface" which enhances image quality viewed through the screen, and, for some viewers, enhances the apparent three-dimensional effect.

Spacing between individual discrete portions is critical but approximately five to twenty percent of the area of the original surface is covered by raised portions projecting from the surface, thus leaving between about eighty and ninety five percent of the outer surface exposed. A typical height 45 of a raised portion standing above a portion of the original surface 43 of the filter is of the order of ten to twenty microns and diameter of the raised portions adjacent the original surface is of the order of one hundred microns. There can be a wide variation in measurements stated above.

Spacing between, and size of, raised portions determines texture density of the textured surface, and the texture density is such that adjacent the axis 36 the texture density is greatest i.e. the percentage of area covered by the raised portions is greatest, and as the distance from the axis 36 increases to outer edges of the filter the textrue density decreases. Measurements given above represent maximum texture density adjacent the axis 36. Gradual reduction of the texture density towards the outer edges of the filter to some extent compensates for reduction of image quality that occurs due to spacing between the image on the screen 28 and the filter.

The reduction in image quality above is due to optical characteristics of the textured surface of the filter. When the filter is held in front of and actually in contact with an object being viewed, there is negligible reduction in image quality. As spacing between the object and the filter is increased image quality is gradually reduced and when the spacing reaches about four inches distortion of the image is such as to make the object virtually indiscernible. Thus for a relatively high texture density, the spacing 38 has to be considerably less than four inches.

As distortion above increases with texture density, texture density decreases from the centre to the outer edges so as to produce negligible distortion at the edges, which might otherwise arise due to increased spacing caused by curvature of the screen. The reduction in texture density from a maximum adjacent the axis 36 to a minimum adjacent the edge is of the order of fifty percent reduction. Clearly there is a wide range of tollerance in this respect and personal preference of the viewer dictates allowable limits.

Method

Several methods are available for producing the particular texture of the outer surface 31 of the filter. One method of producing such a textured surface is to spray a screen made from 1/8th inch thick plastic sheet sold as Rohm No. 2064 (grey). The outer surface is prepared so as to be clean and free from grease and, preferably with the filter disposed horizontally and the outer surface thereof facing upwards is sprayed with a clear plastic lacquer obtainable from regular grade sources in an "Aerosol-type can." A preferred lacquer is distributed by Mills Paint Sales Limited of Vancouver, British Columbia, Canada under the name "Top Coat Florescent No. 507." A further suitable lacquer is sold under the title "Cassel Brite Clear Plastic," which is distributed by Aeropack Sales Ltd., by Custom Aerosol Fillers, New Westminster, British Columbia, Canada. The lacquer used is sold in thirteen ounce pressure cans and is sprayed so that each can covers an area of approximately twelve square feet, when the spray can is held at about twenty inches away from the surface being sprayed.

As stated, the lacquer is sprayed so that the droplets of the spray falling on the surface do not coalesce but produce discrete raised portions closely spaced so that little of the original surface of the filter remains between them. To increase texture density adjacent a central portion of the filter the spraying is selectively directed and monitored so that the central portion receives a greater percentage of spray than portions of the filter adjacent the periphery thereof. Because the plastic lacquer used is clear, the discrete raised portions are generally transparent and thus transmit light from the television screen.

I claim:

1. A light transmitting filter for obtaining an apparent three-dimensional effect when placed in front of a television screen, the filter being characterized by:
   a. a sheet of transparent material having inner and outer surfaces and a periphery defined by edges, the material having a tinting density, the periphery being sufficient to surround the television screen,
   b. the inner surface of the filter being adapted to be placed adjacent the television screen,
   c. the outer surface being a textured surface and having a plurality of generally transparent discrete raised portions extending therefrom, the discrete raised portions being spaced from adjacent raised portions so that portions of the outer surface of the transparent material are exposed between the raised portions.

2. A filter as claimed in claim 1 in which the tinting density of the filter is neutral grey.

3. A filter as claimed in claim 1 in which discrete raised portions are colourless.

4. A filter as claimed in claim 1 in which the raised portions extend from the outer surface of the filter a height of between ten and twenty microns.

5. A filter as claimed in claim 1 in which the raised portions have a diameter adjacent the outer surface of the filter of the order of one hundred microns.

6. A filter as claimed in claim 1 in which spacing between and size of the discrete raised portions on the outer surface of the filter define texture density of the textured surface, the texture density being greatest adjacent a central portion of the filter and decreasing toward outer edges of the filter.

7. A filter as claimed in claim 6 in which the texture density adjacent the central portion of the filter is such that between about eighty and ninety five percent of the outer surface of the filter is exposed.

8. A filter as claimed in claim 2 in which the the tinting density is selected so as to transmit approximately forty-four percent of visible light.

9. A filter as claimed in claim 3 in which the filter has a neutral grey tinting density which transmits approximately forty-four percent of visible light.

10. A filter as claimed in claim 6 in which the discrete raised portions are colourless and the tinting density is selected so as to transmit approximately forty-four percent of visible light.

* * * * *